US012742671B2

(12) United States Patent
Crawshaw et al.

(10) Patent No.: US 12,742,671 B2
(45) Date of Patent: Sep. 22, 2026

(54) METERING SYSTEMS AND METHODS

(71) Applicant: SUR-FLO METERS & CONTROLS LTD., Calgary (CA)

(72) Inventors: Steve Crawshaw, Thetford (GB); Simon Blackmore, Thetford (GB); Darrell Nelson, Calgary (CA)

(73) Assignee: Sur-Flo Meters & Controls Ltd., Calgary (CA)

( * ) Notice: Subject to any disclaimer, the term of this patent is extended or adjusted under 35 U.S.C. 154(b) by 333 days.

(21) Appl. No.: 18/552,236

(22) PCT Filed: Apr. 4, 2022

(86) PCT No.: PCT/CA2022/050508
§ 371 (c)(1),
(2) Date: Sep. 25, 2023

(87) PCT Pub. No.: WO2022/213181
PCT Pub. Date: Oct. 13, 2022

(65) Prior Publication Data

US 2024/0302195 A1 Sep. 12, 2024

Related U.S. Application Data

(60) Provisional application No. 63/170,754, filed on Apr. 5, 2021.

(51) Int. Cl.
*F16K 3/02* (2006.01)
*G01F 1/34* (2006.01)
(Continued)

(52) U.S. Cl.
CPC .............. *G01F 15/005* (2013.01); *G01F 1/34* (2013.01); *G01F 1/74* (2013.01); *G01F 25/10* (2022.01)

(58) Field of Classification Search
CPC ............................ G01F 15/005; F16K 3/0209
See application file for complete search history.

(56) References Cited

U.S. PATENT DOCUMENTS 6,053,055 A * 4/2000 Nelson .................... F16K 3/085
73/861.52
6,655,221 B1 12/2003 Aspelund et al.
(Continued)

FOREIGN PATENT DOCUMENTS

| | | |
|---|---|---|
| CA | 2196740 | 7/2003 |
| CA | 2814920 | 10/2015 |

(Continued)

*Primary Examiner* — Alexander A Mercado
(74) *Attorney, Agent, or Firm* — Kyle R Satterthwaite; Ryan W Dupuis; Ade & Company Inc.

(57) ABSTRACT

A flow meter run offers autonomous operation whilst improving measurement performance & confidence, increased safety and improving the total cost of ownership. A plurality of isolation valve assemblies each offer DBB (Double Block & Bleed) isolation to isolate a component or meter run section. This DBB isolation includes components being extracted from the main metering line. The meter run philosophy is detailed with use of a novel rotational orifice meter, though other flow meters may be substituted. The flow meter run also features extractable filters, a rotational and extractable flow conditioner which includes open and blind isolation components. The rotational orifice meter can house several independent orifice plates or nozzles and extractable sample probes and temperature elements. Further instrument sensors include the direct (non-inferred) measurement of density and/or viscosity. The system is configured for multiple sensors to monitor performance, autonomy, validation and isolation.

21 Claims, 6 Drawing Sheets

(51) Int. Cl.

| | |
|---|---|
| ***G01F 1/74*** | (2006.01) |
| ***G01F 15/00*** | (2006.01) |
| ***G01F 25/10*** | (2022.01) |

(56) References Cited

U.S. PATENT DOCUMENTS

| | | | | |
|---|---|---|---|---|
| 7,194,920 | B2 | 3/2007 | Welker | |
| 7,779,861 | B2 * | 8/2010 | Nicolini | F16K 37/0008 251/227 |
| 7,900,522 | B2 * | 3/2011 | Reeve | G01F 1/40 73/861.77 |
| 8,521,436 | B2 | 8/2013 | Wang et al. | |
| 9,086,305 | B2 | 7/2015 | Nelson | |
| 10,605,638 | B2 * | 3/2020 | Cimberio | G01F 1/42 |
| 10,712,221 | B2 * | 7/2020 | Cimberio | G01F 1/42 |
| 2010/0000728 | A1 | 1/2010 | Okeefe et al. | |
| 2013/0255370 | A1 | 10/2013 | Roux et al. | |
| 2017/0261357 | A1 | 9/2017 | Wang et al. | |
| 2018/0120135 | A1 | 5/2018 | Sheverev et al. | |
| 2018/0356314 | A1 * | 12/2018 | Lagus | G01F 1/74 |
| 2021/0348689 | A1 * | 11/2021 | Mann, III | F16K 3/0254 |

FOREIGN PATENT DOCUMENTS

| | | |
|---|---|---|
| CN | 106000041 | 10/2016 |
| CN | 211291871 | 8/2020 |
| CN | 12051002 | 12/2020 |
| GB | 2558906 | 7/2018 |

* cited by examiner

METERING SYSTEMS AND METHODS

CROSS-REFERENCE TO RELATED APPLICATIONS

This application claims benefit under 35 U.S.C. 119(e) of U.S. Provisional Application No. 63/170,754, filed Apr. 5, 2021, the entirety of which is incorporated herein by reference.

FIELD OF THE INVENTION

The invention generally relates to metering systems and methods and includes improvements to flow meters for measuring fluid flow.

BACKGROUND

Several flow meters are known in the art, including mechanical, magnetic & ultrasonic, amongst others. Flow meters perform flow measurement to quantify fluid movement via a pipeline. Orifice meters refers to pipeline assemblies using elements such as an orifice plate. The measurement philosophy is based on differential pressure generated by the flow of fluid through a restriction inserted into the pipeline. The differential pressure may be applied to a transmitter to provide a working output signal representative of the flow rate being measured. Orifice metering has been well established over 60 years. During this period there has been very little innovation despite the use throughout the globe, even today. The lack of innovation has caused several "pain points" as detailed in FIG. 1B. These key operator challenges create issues with Capital Cost, Space & weight restrictions, reduced measurement confidence, increased maintenance, operating and calibration costs, reduced safety levels and an increasing concern of flaring to environment.

A pipeline flow measurement assembly can be known as a "meter run". Consisting of dedicated up and downstream pipe, and meter run components such as a Flow conditioner, Orifice plate and thermowell being fixed and intrusive in the pipeline. The only method of extraction is pipeline depressurisation, venting and dis-assembly. This process can lead to venting of harmful gasses to atmosphere and "bypassing" isolation lines leading to safety challenges and further venting. Meter runs are also required to be shutdown and inspected on a frequent basis.

One of the joint inventors of the subject application previously developed and patented a novel and improved metering run, as fully disclosed in his UK Patent No. GB2558906, the entirety of which is incorporated herein by reference. That prior invention, and the present invention disclosed herein that improves upon that prior invention, were conceived with the collective intent to at least partially address one or more of the following aims:

- Provide the ability to clean, calibrate and inspect the pipeline structure in-situ without the need to break pipeline integrity;
- allow for the safe extraction of instruments attached to the meter run in a safe Double Block and Bleed (DBB) environment without the need to replace the meter run itself;
- reduce Flaring and downtime and mitigate the need to interrupt other plant areas;
- provide Intelligent feedback to the operator by way of sensors and flow computing algorithms, for single and multiphase applications;
- allow for remote monitoring and operations by way of the meter run being autonomous for operation, rectification and validation of differential pressure (DP) process transmitters;
- enable "pigging" of the meter run to allow for the cleaning and/or dimensional checks of the meter run;
- the dynamic continuous monitoring of pipeline performance and process phase changes;
- achieve full DBB proven isolation monitoring to HSG253 Cat II;
- provide ease of inspection and extraction of the flow conditioner; and
- save space and weight through integrated Line Blinds and Flow Conditioner Unit.

In brief, the present invention further builds and improves upon the prior UK patented invention with continued aim toward the goal of providing improved metering and ease of extraction with minimal interruption to the pipeline.

SUMMARY OF THE INVENTION

According to a first aspect of the invention, there is provided a rotary chamber isolation valve selectively operable to establish double block and bleed (DBB) isolation between two sections of a flow meter run, said rotary chamber isolation valve comprising a housing having an internal chamber containing rotatable discs, each having different spots thereon that, via rotation of said rotatable discs, are selectively movable into and out of a working position residing inline of the two sections of said flow meter run to change a flow status of said rotary chamber isolation valve between a closed DBB state establishing said DBB isolation between said two sections of the flow meter run, and at least one flow state that allows flow between said two sections of the flow meter run.

According to a second aspect of the invention, there is provided a metering system comprising a flow meter run, a sensor suite installed in said flow meter run and a flow computer connected to said sensor suite, wherein said metering system is characterized by an absence of any radioactive gamma ray source, and said sensor suite includes a combination of:

- a fractional phase meter operable to analyse multiple phases of a process flow moving through said metering system;
- a flow meter operable to determine a velocity of said process flow; and
- a downstream water cut meter;
- wherein output signals from said combination are used by the flow computer to perform multi-phase measurements, in the absence of said any radioactive gamma ray source.

According to a third aspect of the invention, there is provided a metering system comprising a flow meter run, a sensor suite installed in said flow meter run and a flow computer connected to said sensor suite, wherein said sensor suite includes a direct density measurement sensor and a direct viscosity measurement sensor, from which direct density and viscosity measurements are used for automated calculation of a Reynolds number, which said flow computer uses to automatically and dynamically updates a drag coefficient (Cd) for accuracy optimization of other automated measurement calculations using said drag coefficient.

According to a fourth aspect of the invention, there is provided a metering system comprising:

- a flow meter run;

a sensor suit installed in said flow meter run, and including a set of pressure transmitters installed therein to obtain pressure measurements of a process flow moving through said flow meter run;

a flow computer connected to said sensor suite; and an automated measurement validation system for validating pressure measurements taken by said pressure transmitters, said automated measurement validation system comprising a pressure controller communicably connected to said flow computer, and a plurality of electronically actuated valves installed between a pressure source and respective pressure ports of the pressure transmitters, said valves being controlled by said pressure controller to selectively expose said pressure ports to applied pressure of a known value from said pressure source, of which said known value is automatically compared against measured pressure values from the pressure transmitters for automated validation of operating performance of the pressure transmitters against prescribed accuracy standards.

Disclosed embodiments of the present invention include a flow meter run assembly, comprising of a series of DBB (Double Block and Bleed) isolation valves to (i) safely isolate components for extraction purposes (ii) safely isolate meter run sections to reduce the volume of bleeding. A DBB valve generates a two independent blocks with a middle bleed section to allow for venting to atmospheric pressure, whilst monitoring this bleed section for any bypass of the primary block section. Although DBB valves have previously been employed for the inlet and outlet section of a meter run, unique designs disclosed herein improves these valve components to add the benefits previously advised for extraction and section isolation.

Safety is increased in certain embodiments by using a line blind design versus traditional ball valves which have a tendency to bypass.

By reducing the physical area of venting, certain embodiments also improve the environmental aspects of flaring the product to atmosphere.

Certain embodiments allow the extraction of any intrusive pipeline components and allows for the unique process of "pigging" the meter run with out the need for breaking pipeline integrity. This process allows for the live pipeline cleaning and inspection previously undertaken in a depressurised and dis-assembled state. This vastly reduces cost and increases safety for this operation.

Certain embodiments include a rotary design of a combined DBB Line Blind and Flow Conditioner, which allows for multiple options upstream of the meter. This rotary design houses a plurality of plates (e.g. 3-5 plates) for differing needs (Closed state, Open state and one or more different flow conditioning states). The design vastly reduces the physical footprint and weight of the system.

In addition to use this rotably-selectable plurality of plates at a flow condition upstream of the flow meter, a similar rotary design is also used in the flow meter itself in certain embodiments, and optionally also downstream of the flow meter in certain embodiments, e.g. in a final downstream DBB valve of the metering run at the outlet section thereof.

In certain embodiments, by having an open plate within the rotary housings of each these DBB valves (flow conditioner, flow meter, and final DBB), this allows a pig to freely move through the complete meter run without any line intrusions during a pigging operation.

Other extractable components in certain embodiments may include one or both of a Thermowell & Sample Probe that can be removed under line pressure by utilising DBB isolation philosophy.

Upstream of the flow conditioner, an extractable filter is preferably included, which can be removed via DBB isolation. This filter removes particulates prior measurement to reduce the probability on inaccurate measurement.

As mentioned above, the flow meter itself is of a rotary design housing multiple plates in certain embodiments. These plates can be rotated into selective alignment with an eccentric pipeline offset from the rotational center of the flower meter, and can preferably be inspected and removed from an included inspection port in the housing.

In certain embodiments, this flow meter can be further adapted with the use of a fractional cross section monitor that analyses the various phases of the process stream (oil/water/gas). Combined with the flow meter (Velocity) and a water cut meter preferably included downstream, the resulting combination of signal outputs to the flow computer enables a novel method for single, dual and multiphase measurements without the need for a radioactive gamma source.

Additionally, by including direct density and viscosity measurements in certain embodiments, the flow meter is able to monitor changing process conditions on a dynamic basis to amend the Cd (Co-efficient Discharge) value of the meter in the computer-executed process monitoring and control algorithms to allow for accurate measurement. This dynamic approach is unique to flow measurement.

The rotary orifice meter in certain embodiments also allows the option to switch from traditional orifice plates to multi-hole plates (to reduce the upstream straight length), or alternatively a flow nozzle (more suited for abrasive process).

In certain embodiments, the meter run is provided with multiple DP (Differential Pressure), P (Pressure), T (Temperature), Viscosity, Density and Water Cut sensors. These instruments monitor and control the process of maintaining accurate measurements. These instruments also allow for condition-based monitoring by cross correlation of the High, Low and Recovered DP values across the meter.

Output signals from these instruments are routed into the flow computer and control unit and may be used to alert authorized personnel and thereby incite any necessary human and/or automated action needed in relation to any process monitored by these instruments.

By integrating automation into the DBB instrument valves and actuation of the rotary chambers in certain embodiments, this offers the unique benefit to remotely control the meter and its validation without the need for human integration and there by offering a completely autonomous operation.

In certain embodiments, validation of the DP transmitters are carried out remotely by utilising a pressure source via a precise pressure controller into a solenoid manifold. In turn this, pressure can be directed to any high or low port of the transmitters to verify the reading therefrom against the outputted pressure values of the pressure controller, and in turn notifying the control station of a validated transmitter whose performance has been confirmed against a prescribed accuracy standard.

In certain embodiments, the flow conditioner is monitored by way of DP transmitter in the interest of maintaining measurement accuracy. A partially blocked Flow Conditioner can affect accuracy by 0.25%. The transmitter will dynamically monitor this and alert the control room of any discrepancies and need for rectification.

The design philosophy shared among the forgoing aspects of the invention, and others that may be apparent from the further detailed disclosure below, can offer huge versatility, particularly with incorporation of the disclosed measurement applications using state of the art instrumentation and communications, hence the use of tradename "iModul®"—Intelligent & Modular, by which any number of components, systems or subsystems describes herein may be referred.

BRIEF DESCRIPTION OF THE DRAWINGS

Preferred embodiments of the invention will now be described in conjunction with the accompanying drawings in which.

DETAILED DESCRIPTION

Figure 1A:
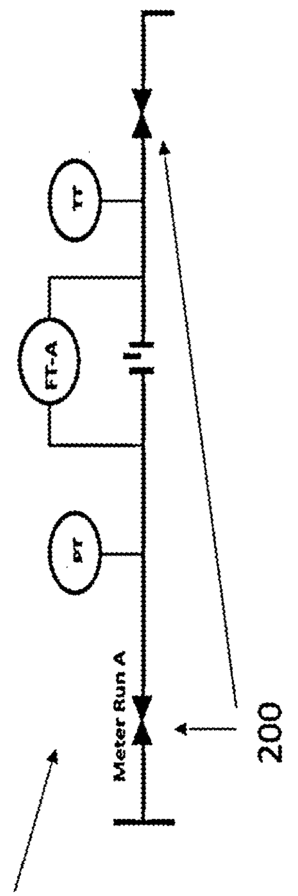
FIG. 1A is a schematic representation of a prior art meter run with block line valves at both ends of the meter run, upstream and downstream.
Figure 1B:
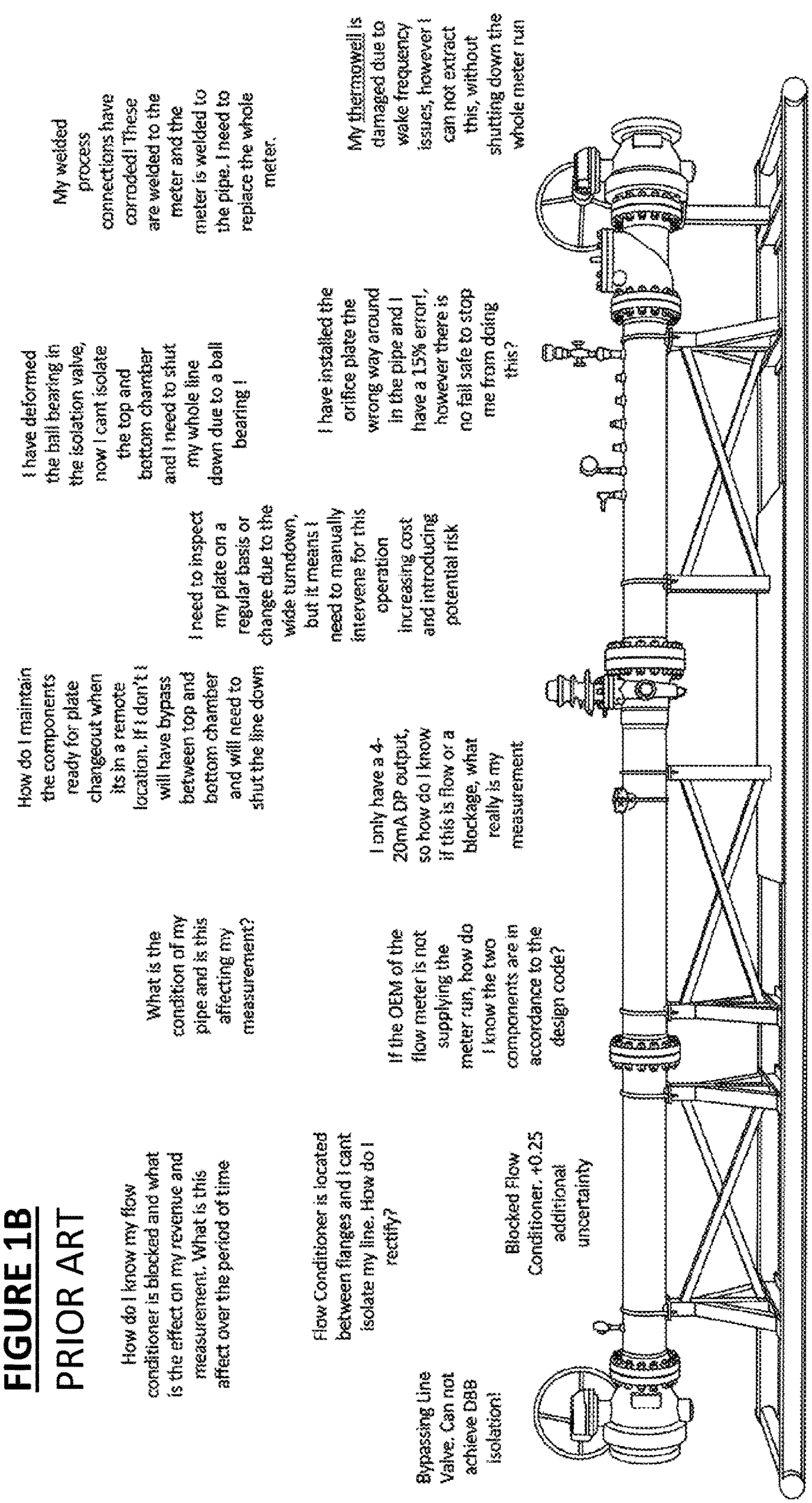
FIG. 1B shows a more photorealistic representation of a prior art meter run, annotated with known shortcomings thereof.

FIG. 1A shows a prior art meter run 100 having a respective block line valve 200 at the end of each of the upstream and downstream sections of the meter run. A disadvantage with this conventional embodiment is that it is only capable of isolating the meter run as a whole, and perhaps more importantly, means that the entire volume of the gas medium in the whole of the line is flared to the environment, thus impacting the amount of CO2 levies incurred by such flaring, notwithstanding the additional operating costs and downtime associated with conventional block line valves. A further problem faced by operators of such meter runs is that, in some cases, the line valve may also bypass, thereby causing unsafe isolation issues. The operator would then face the challenge of locating the next viable isolation point meaning further pipeline volume flaring and extended equipment downtime. In some cases, the pipeline has to be diverted to other facilities, again incurring vastly increased costs and downtime.

Figure 2A:
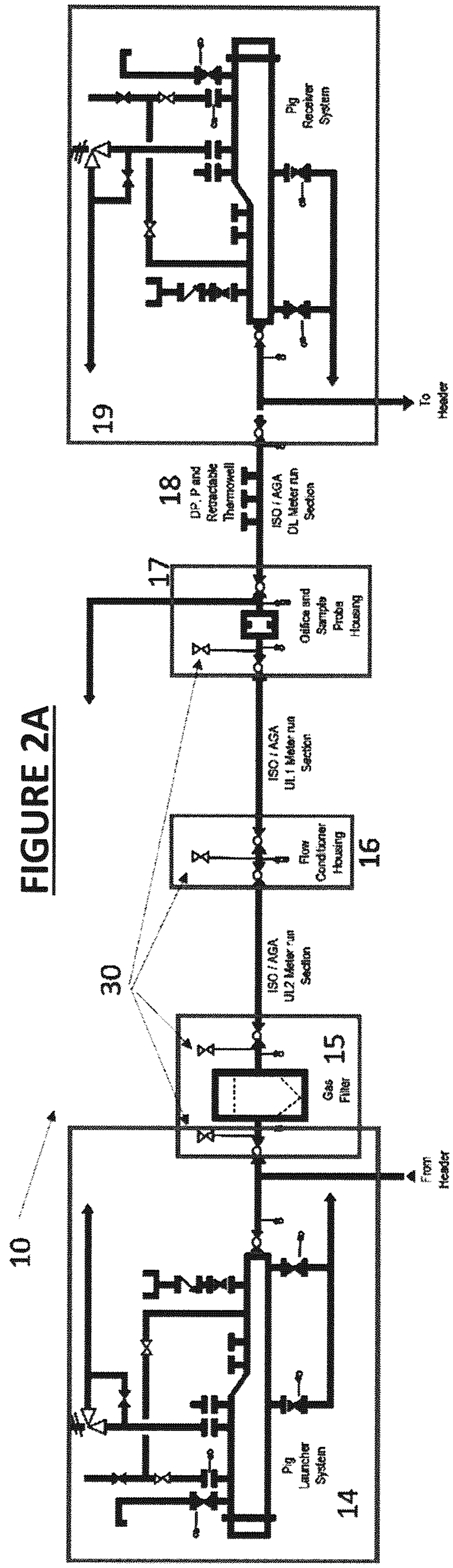
FIGS. 2A and 2B are schematic representations a general layout shared by both the metering run of the aforementioned UK patent, and a metering run of the present invention, in which double block and bleed (DBB) valves are useful to isolate system components or meter run sections.
Figure 2B:
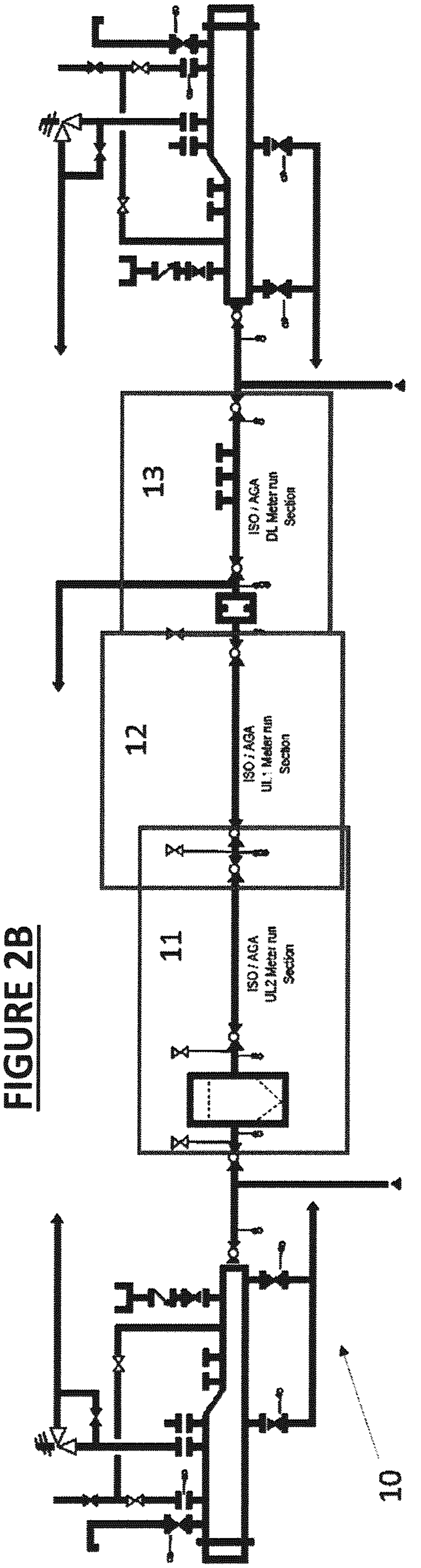

With reference to FIGS. 2A and 2B, a system 10 has three spool meter run sections 11, 12 and 13 and includes a set of Double Block and Blind (DBB) line valves 30 distributed among all three of those section 11, 12, 13. These DBB line valves 30 allow for the isolation of singular product or meter run sections as shown in FIGS. 2A and 2B, respectively. In this example, the system includes a number of assembly components: pig launcher system 14, a gas filter 15 situated downstream of the pig launcher 14, a flow conditioner 16 situated downstream of the gas filter 15, a flow meter and sample probe 17 situated downstream of the flow conditioner 16, a retractable thermowell 18 situated downstream of the orifice meter and sample probe 17, and a pig receiver system 19 situated downstream of the thermowell 18. This general layout is shared by the prior invention of the aforementioned UK patent, and the present invention, though the present invention is differentiated over the prior invention by, among other features described herein below, a novel rotary design of a combined flow conditioner and line blind for the flow conditioner 16, and a similar novel rotary design of a combined flow meter and line blind for the flow meter and sample probe 17.

The pig launcher 14 and pig receiver 19 may each be of a conventional design utilising commercially available prior art products. In a manner well known in the art, these components allow for the introduction of a cleaning and/or measuring pig into the metering run pipeline, which is accommodated in the present invention in a unique manner disclosed below, resulting in whereby offering a uniquely efficient pigging process within the inventive metering run.

The filter 15 is preferably the extractable type disclosed in the aforementioned UK patents, and though illustrated within the metering run itself in the illustrated example, may alternatively be installed and utilised upstream of the metering run in other examples. The filter has a housing and is offered with a DBB. Although major filtration systems are utilised prior to metering, there are particles still reaching the primary measurement point (see FIG. 5*c* of the aforementioned UK patent, which shows contamination of the filter's plate). This causes inaccuracies to result in the metering measurement that can cause major revenue imbalances. This disadvantage is overcome by the presently used filter 15 of the aforementioned UK patent, as this pre-metering filter can be monitored for filter saturation with the ability to DBB isolate the unit 15 and efficiently replace the filtering component of the unit 15. With its extractable filtering component this gas filter 15 is capable of operating in a "pig friendly" mode with the filtering component removed from the housing to allow free passage of the pig through said housing.

Turning now to the combined flow conditioner and line blind 16 of the present invention, a novel rotary design is employed that borrows from the rotary configuration of the rotatably adjustable orifice meter disclosed in U.S. Pat. No. 6,053,055, the assignee of which is one of the joint inventors of the present application, and the entirety of which is incorporated herein by reference. A commercially available example of such a rotatably adjustable orifice meter is the Roto-Boss™ multi-port orifice meter by Sur-Flo Meters and Controls Ltd., of Calgary, Alberta, Canada.

Figure 5A:
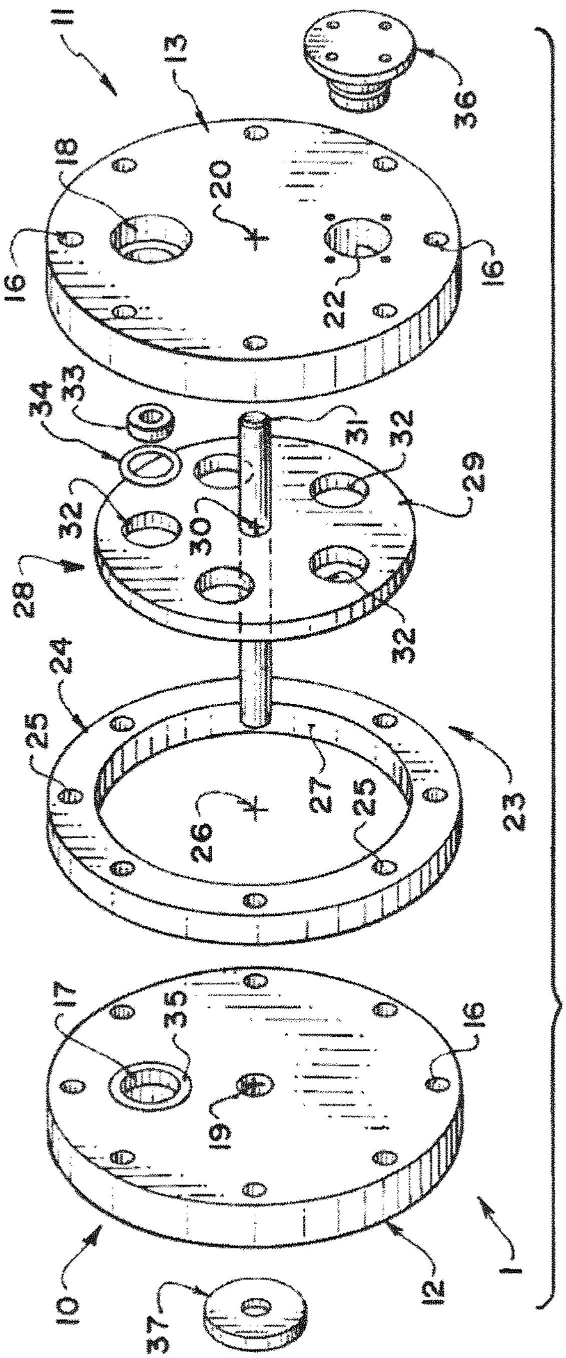
FIG. 5A is an exploded view of a rotatably adjustable orifice meter of the prior art, for the purpose of illustrating constructional details thereof that may be shared by the rotatably adjustable DBB units of the present invention.
Figure 5B:
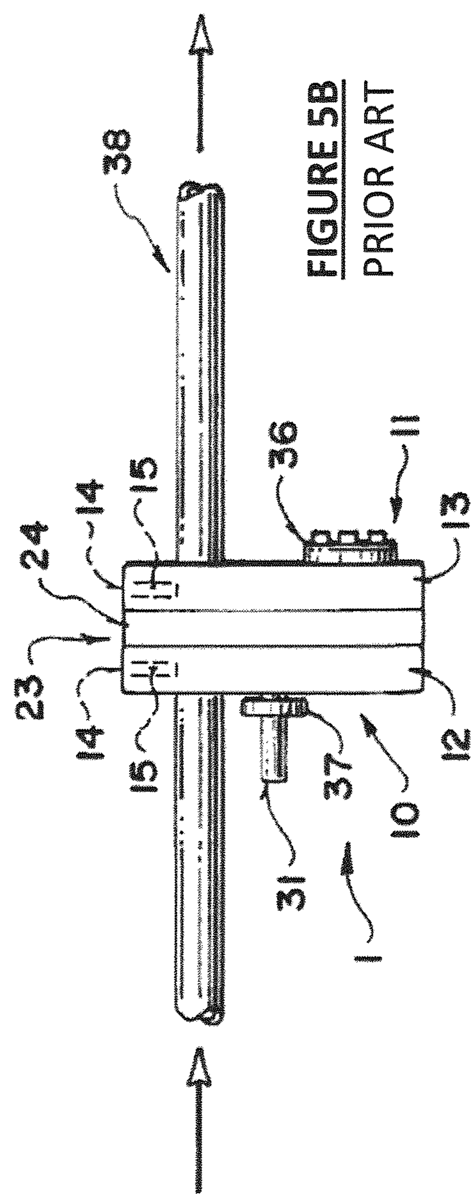
FIG. 5B is an assembled view of the rotatably adjustable orifice meter of FIG. 5A installed in a section of a metering run.

With reference to FIGS. 5A and 5B, such rotatably adjustable multi-port orifice meter has a housing formed by two flange plates and an annular body sandwiched therebetween to enclose an internal chamber between the two flange plates. A circular disc is concentrically and rotatably received within the chamber, and is selectively rotatable about the shared central axis of the disc and the chamber.

The flange plates each have an inlet/outlet opening therein located eccentrically of the central axis, at aligned positions with one another at equal radial distance from the central axis. The pipe spool sections of the metering run are connected at these inlet/outlet openings of the flange plates. The rotatable disc inside the housing is supported on a shaft that penetrates outwardly through at least one of the flange plates, whereby the disc inside the housing can be rotated into different angular positions around the central axis via the externally protruding shaft. The rotatable disc has a plurality of holes therein distributed circumferentially around the central axis at the same radial distance therefrom as the inlet/outlet openings in the flange plates. Accordingly, each of said holes can be selectively aligned with the inlet/outlet openings in an in-line position therebetween via selective rotation of the shaft-mounted disc. In the orifice meter of the aforementioned US patent, each hole in the rotatable disc contains a different respective orifice element therein, whereby differently sized orifice elements can be selectively placed in the metering run through selective rotation of the disc via its protruding shaft. Via an access/inspection port, normally closed by a fitted plug received therein, access to the orifice elements enables inspection, replacement or swapping thereof.

The combined flow conditioner and line blind 16 of the present invention similarly employs a housing installed eccentrically of the pipe spool sections of the metering run to provide an internal chamber in which rotatably adjustable components are held for selective rotation thereof into a working position within the metering run, and into a retracted position extracted from the metering run. However, the eccentric rotary chamber design is modified in a unique way to fulfills the roles of both flow conditioning and isolation. By way of rotating the uniquely configured internal components of the chamber, the combined flow conditioner and line blind 16 is selectively manipulatable between three-different operating modes: (1) an Open state for pigging; (2) a Closed state for isolation; and (3) a Conditioning state for flow conditioning purposes. To enable this unique operation, the chamber of the combined flow conditioner and line blind 16 houses two independently rotatable discs D1, D2, whose selective rotation can be operated either manually or in automated fashion by suitable actuators, for example operating on a respective shaft of each disc that protrudes externally from the chamber via a respective one of the flange plates nearest to that disc (not shown), in similar fashion to the shaft-based rotation control of the singular disc in the multi-port orifice meter of the aforementioned US patent. The chamber further includes pressure instrumentation to allow for the performance monitoring of the flow conditioner, and/or confirmation of achieved positive isolation when in the Closed state (DBB mode).

Figure 3A:
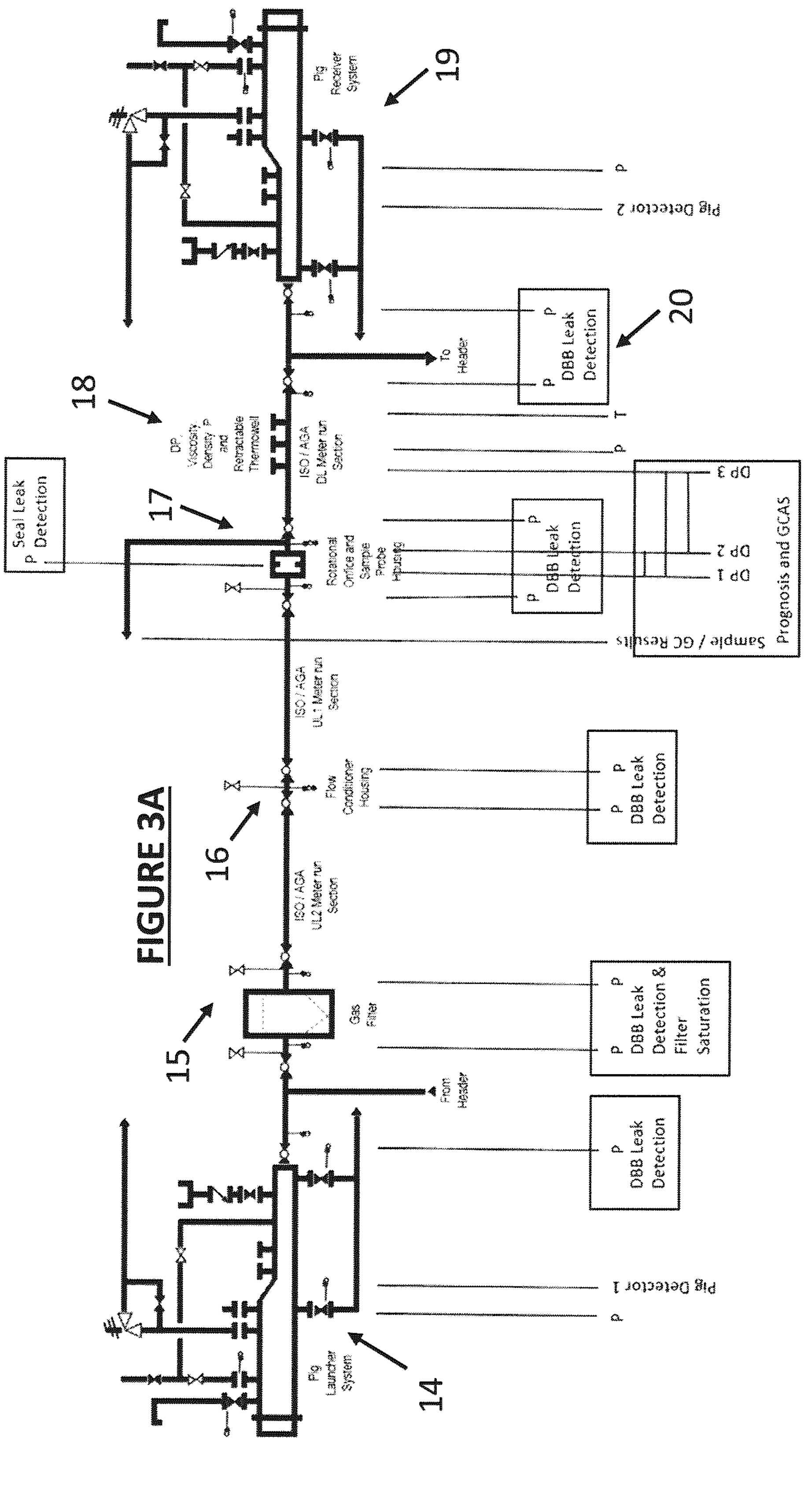
FIG. 3A is a more detailed schematic representation of the metering run of the present invention.
Figure 3B:
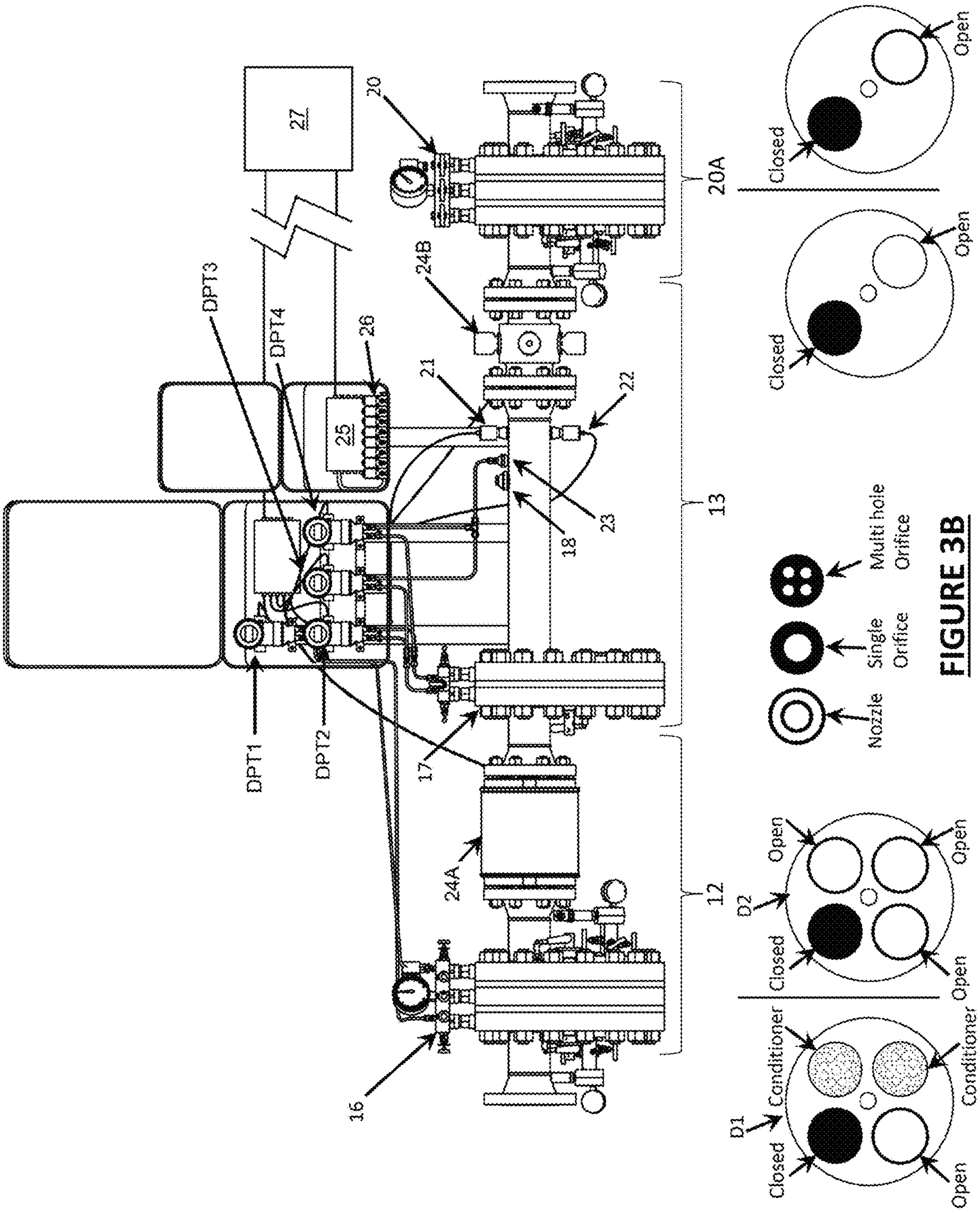
FIG. 3B is another schematic representation of the metering run of FIG. 3A, with emphasis on a novel rotatably adjustable design at each DBB unit in the metering run, including a combined flow conditioning and DBB unit, a combined flow meter and DBB unit, and a final downstream DBB unit at the metering run's output section.

With reference to the schematic illustration FIG. 3B, like the singular disc of the previously patented multi-port orifice meter, each disc D1, D2 of the combined flow conditioner and line blind 16 has a plurality of holes penetrating axially therethrough at equal radial distances from the share central axis of the discs and chamber. The illustrated example features four holes per disc, and each hole has a respective plate inserted therein. In one disc, the respective set of four plates include a closed plate that fully obstructs the respective hole, preventing any flow therethrough; an open plate that leaves a substantial entirety of the respective hole unobstructed to enable passage of a pig therethrough, or passage of the process stream therethrough in non-conditioning fashion; and two differently configured flow conditioning plates between which a human operator or automated control system can select for placement into the working position in the metering run to impart different conditioning actions on the process stream. In the illustrated example, the other disc's set of four plates include one closed plate that fully obstructs the respective hole, and three open plates that leaves a substantial entirety of the respective hole unobstructed. It may be possible that the "open" and "closed" spots in either disc may alternatively be defined by a permanently-open hole and a solid permanently closed area of the disc itself, instead of by removable plates. Nonetheless, removable plates offer greater flexibility, for example for removal and thorough inspection, cleaning, replacement, substitution, etc. Accordingly, each of the areas of the discs residing equidistant from the rotational center thereof and selectively movable into an in-line working position between the metering run's pipe spool sections may be referred to generally as a respective "spot", whether occupied by an empty hole in the disc, a solid intact region of the disc, or a removable plate.

To place the combined flow conditioner and line blind 16 in the closed state (DBB mode), the discs are rotated into positions placing both of their closed plates into the working positions in-line of the metering run, thereby accomplishing full isolation. To place the combined flow conditioner and line blind 16 in the open state (pigging mode), the discs are rotated into positions placing the singular open plate of one disc and any of the three open plates of the other disc into the working positions in-line of the metering run. To place the combined flow conditioner and line blind 16 in the conditioning state (normal mode), the discs are rotated into positions placing one of the flow conditioning plates of the one disc and any of the three open plates of the other disc into the working positions in-line of the metering run. The number of holes and plates may be varied, for example to as few as three holes (open, closed and conditioning), or to more than four holes (e.g. five holes, of which the fifth is occupied by yet another differently configured flow conditioning plate to increase the number of available flow conditioning options selectable by the operator/controller). While the illustrated example has only open and closed plates on the second disc, one or more conditioning plates could be included on the second disc, provided that at least one open plate is included to achieve the open state for the pigging mode of operation. The process stream could be directed through two aligned conditioning plates in the two discs for a compound conditioning effect, or through a conditioning plate of one disc when aligned with an open plate of the other disc for a non-compound single-plate conditioning effect. The benefits afforded by this novel rotary conditioner/DBB design include enabled extraction of the Flow conditioner plate(s) from the metering run without the need for depressurisation or dismantling.

Turning now to the combined flow meter and line blind 17, the illustrated embodiment uses a dual-disc rotary chamber of similar construction to the combined flow conditioner and line blind 16, but differing somewhat therefrom in terms of the particular selection of plates installed in the two rotatable discs thereof. The illustrated example particularly takes the form of a combined orifice meter and line blind, thus incorporating at least one orifice plate into at least one of its rotatable discs, in cooperation with pressure sensors for measuring differential pressure across the orifice, though it may alternatively use other metering technologies within the Differential Pressure category such as Nozzle, Cone, Wedge, or Venturi. Alternatively, the two discs could be equipped solely with open and closed plates for DBB functionality, while relying on other metering technologies for flow measurement, such as ultrasonic, Turbine, Coriolis or any other metering technology that may require or benefit from the pipeline isolation and/or Flow conditioning capabilities of the inventive metering run.

As described above for the combined flow conditioner and line blind 16, the first disc in the upstream/inlet half of the rotary chamber of the combined flow meter and line blind 17 has at least three holes for receiving three respective plates, including, at minimum, one open plate, one closed plate and at least one metering plate. Each metering plate could be, for example, a standard concentric square edge single-hole orifice plate, a multi-hole orifice plate to reduce overall length, and or a nozzle plate to improve measurement in abrasive process streams. The second disc in the downstream/outlet half of the chamber has at least two holes for respectively receiving open and closed plates. A first disc with more than three holes, e.g. four or five holes, could therefore accommodate multiple metering plates, whether of identical size and category, different size within a same metering category (e.g. differently sized concentric single-hole orifice plates), or different metering categories (e.g. single-hole vs. multi-hole orifice plate, orifice vs. nozzle plate, etc.).

The open plate preferably has a sufficient open space void to allow a "pig" to pass through if required. The result is three different operational modes, similar to those described above for the combined flow conditioner and line blind: (1) an Open state for pigging; (2) a Closed state for isolation; and (3) a Metering state for flow metering purposes. However, the present invention also encompasses rotary chamber flow conditioners and flow meters used on metering runs lacking a pig launcher and receiver, in which case the particular sizing of the open space void in the open plate need not be dictated by pig size. As disclosed in the aforementioned US patent, an access/inspection port is preferably provided to enable inspection, cleaning, swapping or replacement of plates, though in the present invention, such a port is provided on both flange plates of the housing to enable such access to the plates of both discs. The unique rotational multi-disc design of the combined flow meter and line blind 17 allows for ease of access to the plates, increased flow range by having different sized plates or extended frequency of inspection if the same size plates are utilised. All internal components of the rotary design are encapsulated in a sealed unit, so not to interfere with the pipeline process, pressure or integrity.

Whilst the combined flow meter and line blind 17 includes traditional High- and Low-Pressure taps for taking pressure readings upstream and downstream of the orifice or other metering constriction, it also incorporates a recovered pressure tap 23 downstream to offer condition-based monitoring. Upstream of the meter is a multiphase fractional sensor 24A, which along with an installed downstream water cut meter 24B, offers a unique method of calculating multiphase flow. Additional sensors 21, 22 which directly measure the density and viscosity are also included, optionally incorporated into a retractable thermowell 18, as schematically shown in FIG. 3A. These devices relate the Reynolds number to the Cd value and can automatically and dynamically adjust this value within the flow computer. This is a unique and inventive solution over conventional practice that requires periodic measurement via human intervention in order to calibrate the system.

Figure 4:
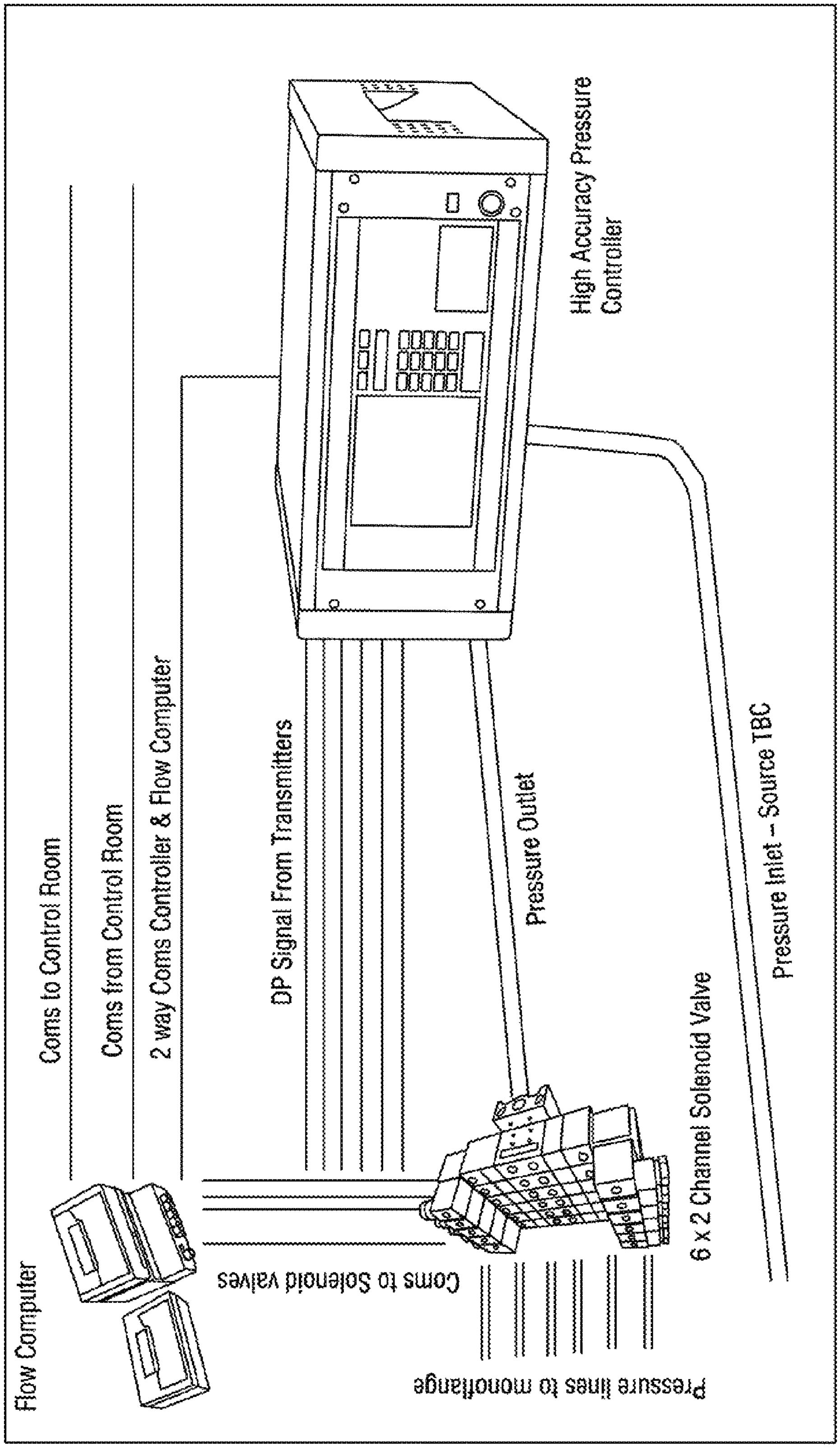
FIG. 4 is a schematic representation of a system for automated testing and validation of various differential pressure transmitters used in the metering run of FIGS. 3A & 3B.

Turning to FIG. 4, schematically illustrated therein is an automated system to validate the differential pressure transmitters (DPTs) that take readings from the high and low pressure taps (HP & LP taps) on the combined flow meter and line blind 17, and likewise from one or more pressure taps on the combined flow conditioner and line blind 16, if included thereon, without the need for human intervention by on-site personnel. In the illustrated example, referring to FIG. 3B, these differential pressures transmitters include DPT1 detecting differential pressure changes across the flow conditioner 16, DPT2 reading differential pressure across the flow meter 17 from the HP & LP taps thereof, DPT3 reading differential pressure between the HP tap of the flow meter 17 and the recovered pressure sensor 23, and DPT4 reading differential pressure between the LP tap of the flow meter 17 and the recovered pressure sensor 23 By way of utilising an external pressure source PS and via a series of valves, high accuracy pressure controller 25, solenoid manifolds 26 linked to both the flow computer 27 and the pressure ports on the transmitters DPT1, DPT2, DPT3, DPT4, control room personnel can transmit to the flow controller a validation-request signal identifying a particular one or more of the pressure transmitters that are to be tested, in response to which the flow computer triggers 27 the pressure controller to generate a predetermined pressure from the external pressure source and opens the respective solenoid valve that leads to the respective pressure port of each of the one or more identified pressure transmitters. The flow controller receives an applied pressure signal from the pressure controller indicative of the actual pressure generated, and receives a measured pressure signal from each of the identified pressure transmitters being tested, and compares these applied and measured pressure values. A result signal is transmitted from the flow computer to the control room to signify whether each tested transmitter is either inside or outside prescribed calibration parameters. The result signal may embody a final validation signal that has already been compared against the calibration standard by the flow computer, or a raw validation signal indicative of only the determined differential between the applied and measured pressure signals before any comparison against the calibration standard, which instead takes place at the control room. This is a unique solution over conventional practice that requires periodic transmitter testing via human intervention in order to validate whether the system is operating within acceptable limits, or requires re-calibration.

For other instruments such as sample probe and temperature thermowell, if required, they can optionally be uniquely positioned within an extractable DBB housing for selectable extraction from the pipeline without interruption to the main pipeline process.

Referring again to FIGS. 3A and 3B, a final downstream DBB unit 20 of similar rotary chamber design to the combined flow conditioner and line blind 16 and combined flow meter and line blind 17 respectively found at the start of sections 12 and 13 of the metering run may be included downstream thereof at a final output section 20A of the metering run. Here, where this unit 20 is for a singular purpose of DBB isolation, without a secondary function like the earlier combination units that also perform flow conditioning or flow metering, each of the two rotatable discs in the rotary chamber have only an open plate and a closed plate for the purpose of switching between two modes of operation (1) the Open state for pigging; and (2) the Closed state for DBB isolation. The downstream rotatable chamber DBB unit 20 is therefore very similar to the upstream Flow conditioner/DBB unit 20, other the fact it does not include any flow conditioning components within it.

It will be appreciated that all outgoing communication signals generated by the flow computer based on measurements taken from the inventive meter run can be monitored both locally in the field, e.g. via a visual display incorporated into the flow computer, or via wired or wireless communications to a remote control centre.

In summary, the invention disclosed herein includes several unique aspects, benefits and advantages, a non-exhaustive listing of which includes:

- A flow meter run comprising of a polarity of isolation valves within a rotational chamber that can be monitored for performance and isolation by way of instrumentation
- An integrated DBB isolation and flow conditioner rotary chamber offering a unique space and weight saving benefit
- A series of extractable instruments via DBB isolation philosophy which can be removed from the pipeline without interruption to the pipeline. This includes Thermowell, Gas Filter & Sample Probe,
- A unique rotary housing capable of holding a plurality of (e.g. 3-5) traditional orifice plates, multi hole orifice plates or nozzles. The design allows for swapping of the elements within the line without pipeline interruption, and increases calibration frequency and flow range.
- The operation for the DBB/Flow Conditioner Housing, Meter Housing and DBB Housing can be both manual and automated.
- A unique cohesion of sensors and instruments to create a multiphase measurement. This includes fractional phase meter, flow Meter and water cut meter. Requiring no gamma sources.
- Direct density and viscosity measurement without inference from pressure and temperature. This allows relation of Reynolds number to Cd value, and automation of these changes within the control system on an automatic, dynamic basis, thereby maintaining accurate measurement.
- A system to automatically and remotely validate the performance of the DP transmitters by utilising an external pressure source, pressure controller and solenoid manifold to pressurize the transmitters, with the results signals used to very the measured pressure values against the calibrated values.
- The overall system design is able to reduce the total cost of ownership and offer safety benefits by way of complete operational, maintenance and validation remote autonomy.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. A rotary chamber isolation valve selectively operable to establish isolation between two sections of a flow meter run, said rotary chamber isolation valve comprising a housing having an internal chamber containing rotatable discs, each having different spots thereon that, via rotation of said rotatable discs, are selectively movable into and out of a working position residing inline of the two sections of said flow meter run to change a flow status of said rotary chamber isolation valve between a closed state establishing said isolation between said two sections of the flow meter run, and at least one flow state that allows flow between said two sections of the flow meter run.

2. The valve of claim 1 wherein the different spots of each rotatable disc comprise at least one closed spot through which flow is fully obstructed, and one or more additional spots through which flow is allowed, whereby rotation of the discs into positions placing their respective closed spots in alignment with one another in the working position in-line between said two sections of the meter run is operable to achieve said closed state, while rotation of the discs into positions placing a pair of their additional spots in alignment with one another in the working position in-line between said two sections allows flow therebetween.

3. The valve of claim 2 wherein the one or more additional spots of each disc includes a fully open pigging spot having a sufficiently sized opening to accommodate passage of a pig therethrough.

4. The valve of claim 2 wherein the discs comprise a first disc, on which the one or more additional spots include a fully open spot, and a second disc, on which the one or more additional spots include at least one matching fully open spot.

5. The valve of claim 4 wherein said fully open spot on the first disc is an only fully open spot of said first disc.

6. The valve of claim 4 wherein said at least one matching fully open spot on the second disc is one of a plurality of fully open spots on said second disc.

7. The valve of claim 4 wherein the one or more additional spots on the second dise comprise, on the second disc, an orifice spot characterized by an orifice is lesser diameter than the fully open spots.

8. The valve of claim 7 wherein the one or more additional spots comprise, on the second disc, a multi-orifice spot characterized by multiple orifices of lesser diameter than the fully open spots.

9. The valve of claim 4 wherein the one or more additional spots comprise, on the second disc, a multi-orifice spot characterized by multiple orifices of lesser diameter than the fully open spots.

10. The valve of claim 2 wherein at least one of the additional spots is a flow conditioning spot configured to impart a conditioning action on the flow moving through the sections of the flow meter run.

11. The valve of claim 10 wherein a plurality of the additional spots are flow conditioning spots configured to impart different conditioning actions on the flow moving through the sections of the flow meter run.

12. The valve of claim 11 wherein the flow conditioning spots all belong to a same one of the discs.

13. The valve of claim 2 wherein the different spots on at least one of the discs consist only of said at least one elesed spots providing full obstruction of flow, and at least one fully-open spot allowing unrestricted, non- conditioned flow.

14. The valve of claim 2 wherein the different spots on the discs consist only of closed spots providing full obstruction of flow, and fully-open spots allowing unrestricted, non-conditioned flow.

15. The valve of claim 2 wherein at least a subset of the different spots are each characterized by presence of a respective hole in the disc, and a separate respective plate installed on the disc at said respective hole to characterize the respective spot on the disc in a manner distinct from at least one other of the different spots on the same disc.

16. The valve of claim 15 wherein said respective plate is removably installed on the disc.

17. The valve of claim 15 wherein all of said different spots have said respective plates installed thereat.

18. A flow meter run comprising one or more valves, of the type recited in claim 1.

19. The flow meter run of claim 18 wherein said one or more valves comprise a combined flow conditioner and line blind.

20. The flow meter run of claim 18 wherein said one or more valves comprise a final downstream valve unit.

21. The flow meter run of claim 18 wherein said one or more valves comprise two valves installed at opposite ends of a pipe section of the flow meter run, and cooperatively operable, in the closed state of each thereof, to establish double block and bleed (DBB) isolation of said pipe section.

* * * * *